US010776401B2

United States Patent
Gross et al.

(10) Patent No.: US 10,776,401 B2
(45) Date of Patent: Sep. 15, 2020

(54) EFFICIENT DATABASE QUERY AGGREGATION OF VARIABLE LENGTH DATA

(71) Applicant: International Business Machines Corporation, Armonk, NY (US)

(72) Inventors: Joshua D. Gross, Hillsboro, OR (US); Vincent Kulandaisamy, Portland, OR (US); Wenbin Ma, Vaughan (CA); Liping Zhang, Portland, OR (US); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 15/465,684

(22) Filed: Mar. 22, 2017

(65) Prior Publication Data

US 2018/0276289 A1    Sep. 27, 2018

(51) Int. Cl.
| | | |
|---|---|---|
| *G06F 16/00* | (2019.01) | |
| *G06F 16/28* | (2019.01) | |
| *G06F 16/25* | (2019.01) | |
| *G06F 16/22* | (2019.01) | |
| *G06F 16/2455* | (2019.01) | |

(52) U.S. Cl.
CPC ........ *G06F 16/285* (2019.01); *G06F 16/2255* (2019.01); *G06F 16/2282* (2019.01); *G06F 16/24556* (2019.01); *G06F 16/258* (2019.01)

(58) Field of Classification Search
CPC ............. G06F 16/285; G06F 16/24556; G06F 16/258; G06F 16/2255; G06F 16/2282
See application file for complete search history.

(56) References Cited

U.S. PATENT DOCUMENTS

| | | | | |
|---|---|---|---|---|
| 7,469,241 | B2* | 12/2008 | Bellamkonda | .... G06F 16/24556 |
| 7,886,124 | B2 | 2/2011 | Muthulingam et al. | |
| 8,788,543 | B2* | 7/2014 | McKenney | .......... G06F 12/1018 |
| | | | | 707/800 |
| 9,384,145 | B2* | 7/2016 | Gura | .................... G06F 12/1018 |
| 10,503,731 | B2* | 12/2019 | Barber | ................ G06F 16/2452 |
| 2002/0099691 | A1* | 7/2002 | Lore | .................... G06F 16/2237 |
| 2006/0085463 | A1* | 4/2006 | Chaudhuri | .......... G06F 16/2462 |
| 2008/0016322 | A1* | 1/2008 | Biedenstein | ...... G06F 16/24556 |
| | | | | 712/204 |

(Continued)

*Primary Examiner* — Thanh-Ha Dang

(74) *Attorney, Agent, or Firm* — Richard Wilhelm; SVL IPLaw Edell, Shapiro & Finnal, LLC

(57) ABSTRACT

Provided herein are techniques for processing a database query aggregating data. Data tuples of a database object each including a grouping element and a data element are analyzed to determine a length of the data element for each data tuple. A plurality of tables each accommodate a successively greater length for the data element. A corresponding table of the plurality of tables to store each data tuple is determined based on the length of the data element of that data tuple relative to the accommodated lengths of the plurality of tables. Each data tuple in the determined corresponding table is stored to group the data tuples within each of the plurality of tables based on the grouping element, and an indication of corresponding tables containing members for each group is provided. The groups are combined across the plurality of tables to aggregate the data tuples for a database query.

20 Claims, 9 Drawing Sheets

(56) References Cited

U.S. PATENT DOCUMENTS

2013/0275365 A1\* 10/2013 Wang ................... G06F 16/283
 707/602
2014/0201222 A1\* 7/2014 C. N. ................ G06F 16/24542
 707/754

\* cited by examiner

202

DATABASE OBJECT

| 202a | 202b |
|------|------|
| 15 | TOM |
| 11 | BRIAN SMITH |
| 15 | VICTOR BALK VERY VERY VERY LONG LONG LONG NAME |
| 19 | NEWTON |
| 15 | IAN |
| 17 | TED |
| 11 | JOHN |
| 14 | PETE |
| 17 | AMY |
| 89 | ABRAHAM MURMBAHBLABLA BISHOOOOO HUFMMMMZZZ |
| 39 | PETE |
| 89 | JEF |
| 2 | CHAD |

FIG.2

EFFICIENT DATABASE QUERY AGGREGATION OF VARIABLE LENGTH DATA

BACKGROUND

1. Technical Field

Present invention embodiments relate to query processing, and more specifically, to efficiently aggregating variable length data in response to a data query.

2. Discussion of the Related Art

Queries are frequently made to retrieve data within a database object. Sometimes the query requests a set (e.g., a subset) of the data within the database object. The intermediate results of operations during query processing (e.g., joins, aggregations, etc.) may be stored in memory using the maximum fixed column lengths for manipulation efficiency relative to handling actual variable length data along with storing the length as an additional field. Actual data within the columns are often empty/null or include only a small payload relative to the total possible (i.e., maximum-length) payload, thereby wasting memory resources.

SUMMARY

According to one embodiment of the present invention, a system for processing a database query aggregating data is provided. The system includes a computer system including at least one processor. The at least one processor is configured to analyze data tuples of a database object each including a grouping element and a data element to determine a length of the data element for each data tuple. A plurality of tables each accommodates a successively greater length for the data element. The at least one processor is further configured to determine a corresponding table of the plurality of tables to store each data tuple based on the length of the data element of that data tuple relative to the accommodated lengths of the plurality of tables. In addition, the at least one processor is configured to store each data tuple in the determined corresponding table to group the data tuples within each of the plurality of tables based on the grouping element and provide an indication of corresponding tables containing members for each group. The at least one processor is also configured to combine the groups across the plurality of tables to aggregate the data tuples for a database query.

BRIEF DESCRIPTION OF THE DRAWINGS

Generally, like reference numerals in the various figures are utilized to designate like components.

FIG. 2 is a block diagram illustrating an example database object that includes data tuples to be aggregated for a database query, in accordance with an embodiment of the present invention.

DETAILED DESCRIPTION

Figure 1:
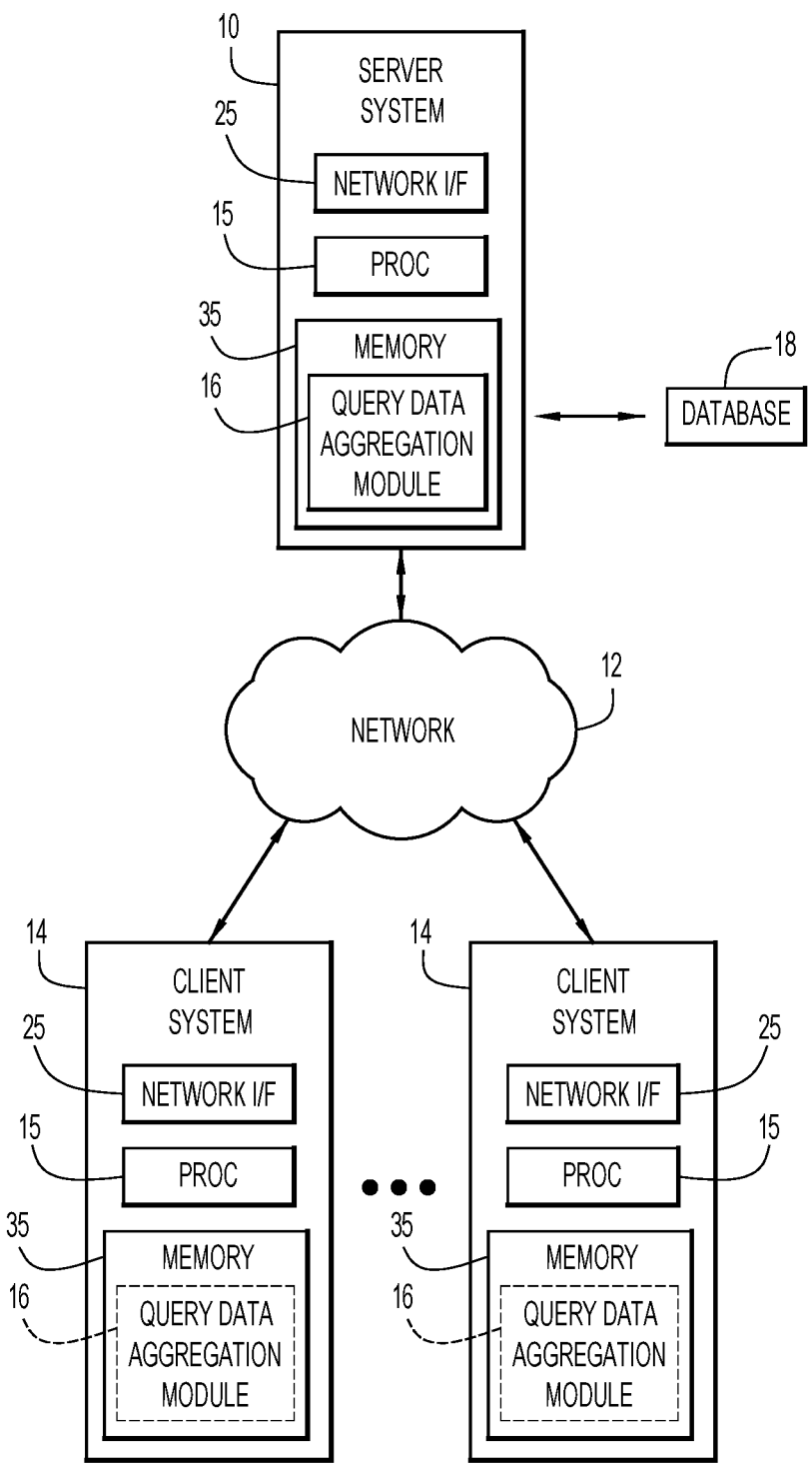
FIG. 1 is a diagrammatic illustration of an example computing environment for use with an embodiment of the present invention.

Handling queries efficiently is challenging when only limited resources (e.g., memory) are available. Poor performance and large memory consumption are particularly problematic when the results data varies widely in length because the payload column in the hash table where the results data are stored often cater to the largest payload length. For efficient vector processing, columnar or main memory databases often use fixed-width vectors to hold column values, which can cause a significant amount of wasted memory on null or relatively small payloads. As such, a large percent of the data has a length that is much smaller than the data type length defined in the table schema. This issue is especially challenging when dealing with large amounts of data and grouping key cardinalities (e.g., in large/complex data analytic workloads, such as for on-premise or cloud applications).

As mentioned above, the average actual length of data in a column is often only a fraction of the designated column type size. For example, the average length of data may be fewer than 10 bytes in a column whose designated type is VARCHAR(2000). Further, many of the payloads in the column may be null. For instance, VARCHAR(2000) payloads in comment columns of survey tables are often null because survey takers rarely provide comments. However, these columns are frequently fixed-length, with the length set at a large value (e.g., 2000) to accommodate the maximum possible payload. As such, in this example, if only a handful of survey takers leave long comments and the remainder of survey takers leave none or small comments (e.g., "great," "cool," "awesome," "terrible," etc.), a large amount of memory is wasted on the memory allocated for VARCHAR(2000) payloads that are, in reality, empty/null. This excessive memory allocation can cause a query to return an out-of-memory error, and can also cause performance issues because very large data structures can cause a cache miss or longer memory access time. It can also negatively impact system throughput and concurrency levels. Meanwhile, setting the designated type to, for example, VARCHAR(10) creates difficulty in storing the long comments.

Present invention embodiments involve processing a database query aggregating data to optimize memory and processing efficiency. Embodiments include analyzing data tuples of a database object each including at least one grouping element (e.g., hash keys) and at least one data element (e.g., large variable length aggregation hash payload) in order to determine an optimum processing length of the at least one data element. In an embodiment, a plurality of tables each accommodate a successively greater length for the data element. The plurality of tables may include hash tables with the grouping element serving as a hash key. A corresponding table of the plurality of tables may be determined to store each data tuple based on the length of the data element of that data tuple relative to the accommodated lengths of the plurality of tables. For example, if the length of a data element is at or below length L, the corresponding data tuple may be determined to be stored in a first table that can accommodate data elements up to length L. In this example, if the length of a data element is above length L, the corresponding data tuple may be determined to be stored in a second table that can accommodate data elements above length L. The length of the data element provided by the plurality of tables may be based on one or more of the following: average length of data elements of the database object, distribution of the length of data elements in the database object, and frequency of data elements in the database object.

For example, if a column has a maximum length of 200 characters but an average payload length of only 15 characters, two aggregation hash tables having column lengths of 30 and 200, respectively, may be selected. A column length of 30 may be selected because, in this example, it is desired to include a greater number of column values in the smaller hash table by setting the column length of the smaller table to be slightly greater than the average character length of 15 characters. In another example, a column may have a maximum length of 200 characters with the following distribution statistics: 70% of the payload lengths are less than or equal to 10 characters; 25% of the payload lengths are less than or equal to 30 characters; and 5% of the payload lengths are greater than 30 characters. In this example, three hash tables having column lengths of 10, 30, and 200, respectively, may be selected.

A further embodiment includes storing each data tuple in the determined corresponding table to group the data tuples within each of the plurality of tables based on the grouping element and providing an indication of corresponding tables containing members for each group. The indication may include a bitmap including one or more bits for each group, wherein each pattern of the one or more bits is associated with one of the plurality of tables. The groups may be combined across the plurality of tables to aggregate the data tuples for a database query. The groups may be combined by, for example, aggregating members of a group within one of the plurality of tables and merging the aggregated members into a next one of the plurality of tables having members of that group based on the bitmap.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to query data from a database 18 (e.g., query for a maximum value for each of a category in the database 18, etc.) via server systems 10. The server systems 10 include a query data aggregation module 16 to efficiently aggregate wide variable length data in response to the query. A database system 18 may store various information for the analysis (e.g., survey results, etc.). The database system 18 may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems 14 may present a graphical user (e.g., GUI, etc.) or other interface (e.g., command line prompts, menu screens, etc.) to query and/or aggregate the data.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, query data aggregation module 16, browser/interface software, etc.).

Alternatively, one or more client systems 14 may aggregate the wide variable length data when operating as a stand-alone unit. In a stand-alone mode of operation, the client system stores or has access to the data (e.g., database 18), and includes query data aggregation module 16 to efficiently aggregate wide variable length data in response to the query. The graphical user (e.g., GUI, etc.) or other interface (e.g., command line prompts, menu screens, etc.) solicits information from a corresponding user pertaining to the query and/or aggregating the data.

Query data aggregation module 16 may include one or more modules or units to perform the various functions of present invention embodiments described below. The various modules (e.g., query data aggregation module 16) may be implemented by any combination of any quantity of software and/or hardware modules or units, and may reside within memory 35 of the server and/or client systems for execution by processor 15.

Present invention embodiments relate to aggregating data tuples for a database query. FIG. 2 illustrates an example database object 202 that stores data tuples to be aggregated for a database query. Grouping key column 202a of database object 202 stores the hash keys of the data tuples, and the payload column 202b stores each of the hash payloads of the data tuples.

Database object 202, by way of example, is a table defined as follows: Records (202a INT, 202b Varchar(200)). That is, grouping key column 202a accepts integers corresponding to the hash keys, and the payload column 202b accepts up to 200 characters (e.g., letters, numbers, etc.) corresponding to the hash payload. Database object 202 stores a total of thirteen data tuples: [15, Tom], [11, Brian Smith], etc. Certain data tuples in database object 202 share hash keys (e.g., [15, Tom] and [15, Victor Balk very very very long long long name]; [17, Amy] and [17, Ted]; [89, Abraham Murmbahblabla Bishooooo Hufmmmmzzz] and [89, Jef]; etc.). Certain other data tuples do not share hash keys (e.g., [19, Newton], [14, Pete], etc.). Significantly, the hash payloads in column 202b vary widely in length. For example, "Victor Balk very very very long long long name" and "Abraham Murmbahblabla Bishooooo Hufmmmmzzz" are very long payloads, whereas "Tom," "Ian," and "Amy" are very short payloads. Generally, techniques described herein are applicable to any database object configured to store data tuples (e.g., vector, etc.).

In an example, a database query is made as follows: SELECT C1, MAX (C2) FROM Records; GROUP BY C1. That is, the query is for the maximum value of payload column 202b (or C2) for each hash key value in grouping key column 202a (or C1). In other words, the result of the query will return one data tuple for each hash key in grouping key column 202a. For the data tuples in database object 202 that share a hash key, only the data tuple having the payload with the greatest value (e.g., the lowest in alphabetical order, the largest number value, etc.) for that hash key and corresponding grouping element will be returned.

Conventionally, all the results of the query may be generated in a single hash table, which wastes valuable resources (e.g., memory). The hash table needs to have a payload column whose length is long enough to accommodate the largest-length payload (e.g., "Victor Balk very very very long long long name"), even though the payload column also stores other payloads whose lengths are much smaller than the length of the payload column (e.g., "John," "Ted," "Jef," etc.). As a result, memory is wasted in conventional arrangements because an excess of memory is allocated to smaller payloads.

As such, provided herein are techniques for minimizing memory waste caused by these conventional techniques. For instance, FIGS. 3A-D are a flowchart illustrating an example manner of aggregating variable length data based on a database query of database object 202. Continuing reference will be made to FIGS. 4-6 to further illustrate the example manner of FIGS. 3A-D.

Figure 3A:
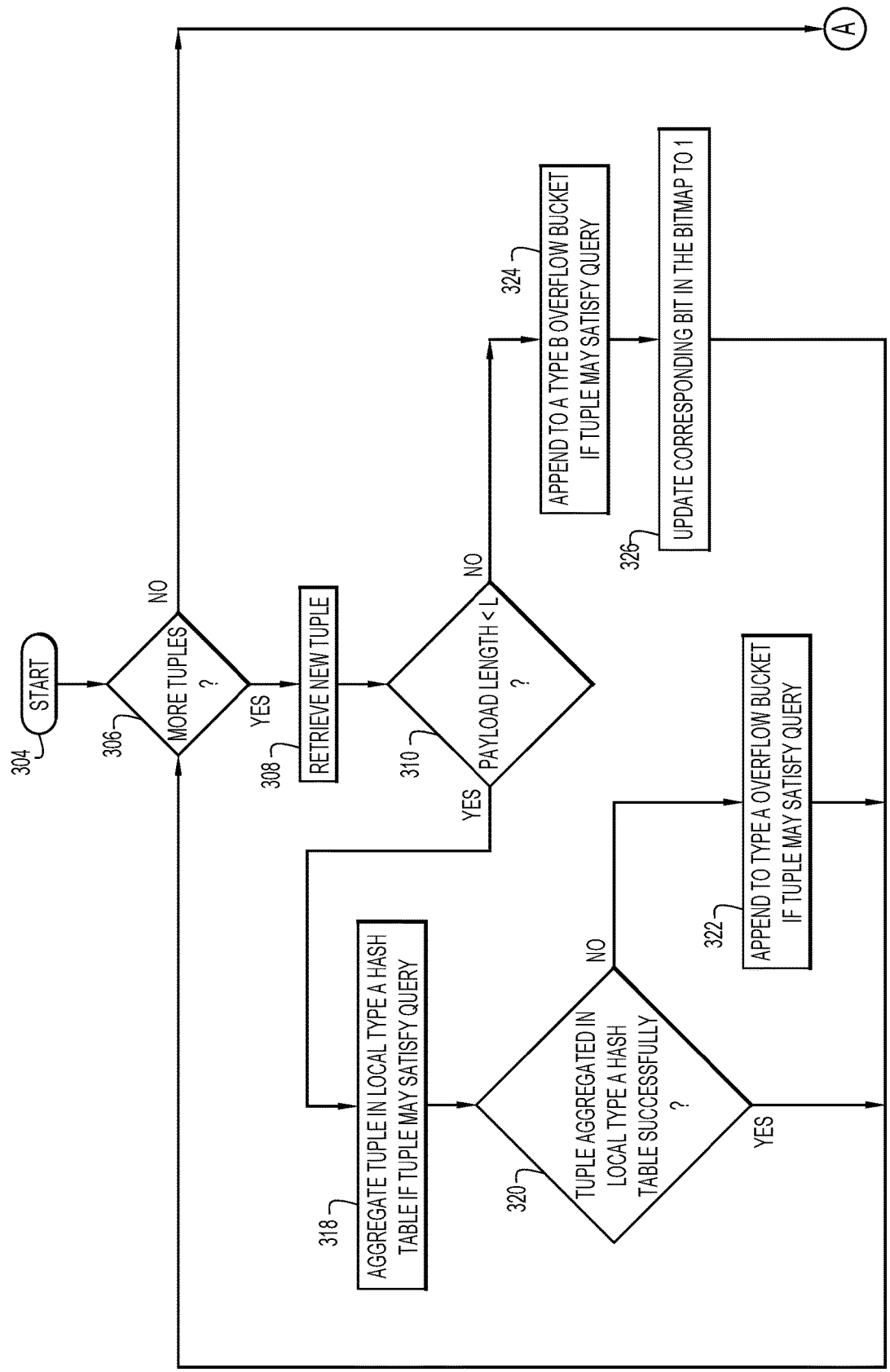
FIGS. 3A-D are a flowchart illustrating an example manner of aggregating variable length data based on a database query according to an embodiment of the present invention.
Figure 4:
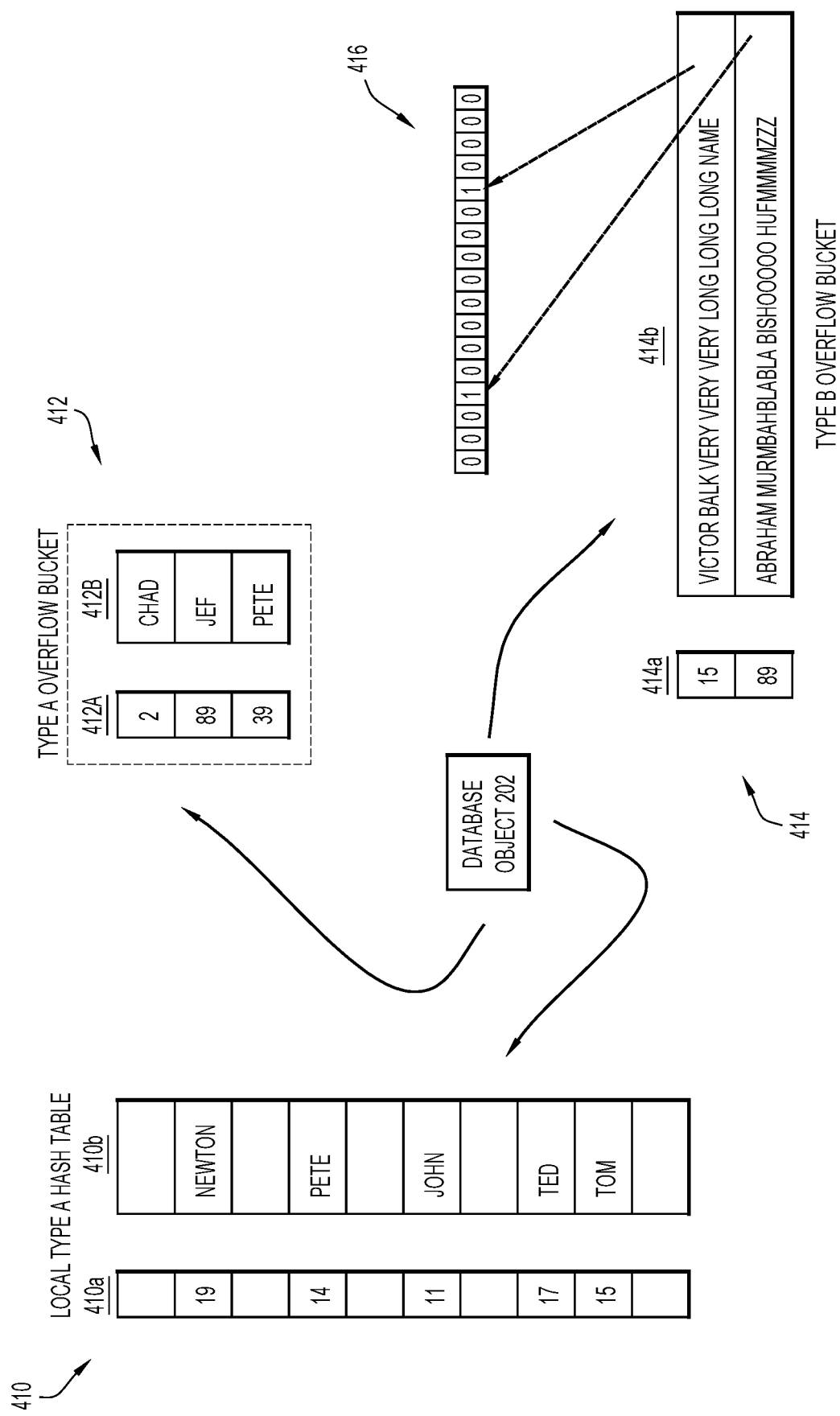
FIG. 4 is a diagrammatic illustration of the data tuples of FIG. 2 being sorted into a local hash table and overflow buckets, in accordance with an embodiment of the present invention.

FIG. 3A illustrates an example manner of aggregating database object 202 data tuples in local Type A hash table 410, Type A overflow bucket 412, and Type B overflow bucket 414 (FIG. 4). The example manner starts at block 304. At block 306, it is determined whether there are data tuples that have not yet been retrieved from the database object 202. If so, a data tuple (e.g., [15, Tom], [11, Brian Smith], etc.) is retrieved from the database object 202 at block 308. It is determined whether the length of the payload of the data tuple is less than a length L at block 310. Depending on this determination, the data tuple may be aggregated to a local hash table or appended or otherwise placed in overflow bucket(s), as explained below with reference to FIG. 4.

Turning now briefly to FIG. 4, shown are data tuples from database object 202 aggregated to a local hash table 410 or appended to overflow buckets 412, 414. Each of the hash table 410, overflow bucket 412, and overflow bucket 414 include respective grouping key columns 410a, 412a, 414a and respective payload columns 410b, 412b, 414b. The hash table 410 and overflow bucket 412 are designated as "Type A," which signals that the width of payload columns 410b, 412b are less than length L. Overflow bucket 414 is designated as "Type B," which signals that the width of payload column 414b is equal to or greater than length L. As explained in greater detail below, bitmap 416 indicates which grouping keys include at least one data tuple that is placed in Type B overflow bucket 414.

Turning back now to FIG. 3A, and with continued reference to FIG. 4, if the length of the payload of the data tuple is less than length L, the data tuple is aggregated in local Type A hash table 410 at block 318. In an example [19, Newton] was retrieved from database object 202 at 308. The length of "Newton" is less than length L ("Yes" at block 310). As such, [19, Newton] is aggregated in local Type A hash table 410 at block 318 because it may satisfy the query. At block 320, it is determined whether the data tuple was successfully aggregated in local Type A hash table 410. As shown in FIG. 4, Newton was successfully aggregated in local Type A hash table 410 and, as such, the flow proceeds to block 306 to determine whether any other data tuples have not yet been retrieved from the database object 202.

In another example, [39, Pete] was retrieved from database object 202 at 308. Like "Newton," the payload length of "Pete" is less than length L and, as such, [39, Pete] is aggregated in local Type A hash table 410 at 316. However, this aggregation was unsuccessful ("No" at block 320). There are a number of reasons a data tuple may be unsuccessfully aggregated in a hash table (e.g., local Type A hash table 410). For instance, a hash table generally uses a maximum of approximately 50-75% of its theoretical capacity for storage because storing beyond that capacity in a hash table yields a strong likelihood of collision. For this reason, local Type A hash table 410 is shown in FIG. 4 as using only 50% of its theoretical capacity. As such, in this example, the aggregation may have failed for [39, Pete] in the interest of avoiding collisions in local Type A hash table 410. Because the aggregation in local Type A hash table 410 was unsuccessful (and since [39, Pete] may satisfy the query), [39, Pete] is instead placed in Type A overflow bucket 412 at block 322. From block 320, the flow proceeds back to block 306 to determine whether any other data tuples have not yet been retrieved from the database object 202.

Because the query called for only the maximum payload for each grouping key, only the data tuple with the maximum payload for each grouping key is aggregated to the local Type A hash table or the Type A overflow bucket. For example, as shown in FIG. 4, [11, John] but not [11, Brian Smith] is aggregated in local Type A hash table 410 (because "John" is subsequent in the alphabet to "Brian Smith"). As such, in this example invention embodiment, there is no more than one data tuple per grouping key in local Type A hash table 410 and Type A overflow bucket 412. By contrast, [89, Jef] and [89, Abraham Murmbahblabla Bishooooo Hufmmmmzzz] are both aggregated to their respective overflow buckets because, at the time of aggregation, they may have satisfied the query from the standpoint of the system (even though eventually it will be determined that only [89, Jef] satisfies the query). This is because [89, Jef] and [89, Abraham Murmbahblabla Bishooooo Hufmmmmzzz] have not yet been compared to determine which payload contains a maximum value.

In yet another example, [15, Victor Balk very very very very long long long name] was retrieved from database object 202 at 308. Unlike shorter payloads (e.g., "Newton" or "Pete"), the payload length of "Victor Balk very very very very long long long name" is equal to or greater than length L, as determined at block 310. As a result, [15, Victor Balk very very very very long long long name] is placed in Type B overflow bucket 414 at block 324. At 326, the bit in bitmap 416 that corresponds to grouping key "15" is set to "1." This signals that a data tuple with the grouping key "15" is located in Type B overflow bucket 414. In general, a bloom filter (e.g., bitmap) may be built at any stage in the aggregation process before the final processing of the data in Type B overflow bucket 414 in order to facilitate the final aggregation. At block 306, it is again determined whether there are other data tuples in the database object 202 to be retrieved.

Briefly, local Type A hash table 410 and Type A overflow bucket 412 include data tuples with payloads whose lengths are less than length L. Local Type A hash table 410 and Type A overflow bucket 412 do not include more than one data tuple with a given grouping key because the query requires only a single data tuple for each grouping key. Type B overflow bucket 414, however, may include data tuples having identical grouping keys to data tuples in local Type A hash table 410 and Type A overflow bucket 412. For example, [15, Victor Balk very very very very long long long name] is in Type B overflow bucket 414 and [15, Tom] is in local Type A hash table 410. Similarly, [89, Abraham Murmbahblabla Bishooooo Hufmmmmzzz] is in Type B overflow bucket 414 and [89, Pete] is in Type A overflow bucket 412. These overlaps exist because the system has not yet compared the Type B data tuples with the Type A data tuples to determine which has the maximum payload value, as required by the query.

Figure 3B:
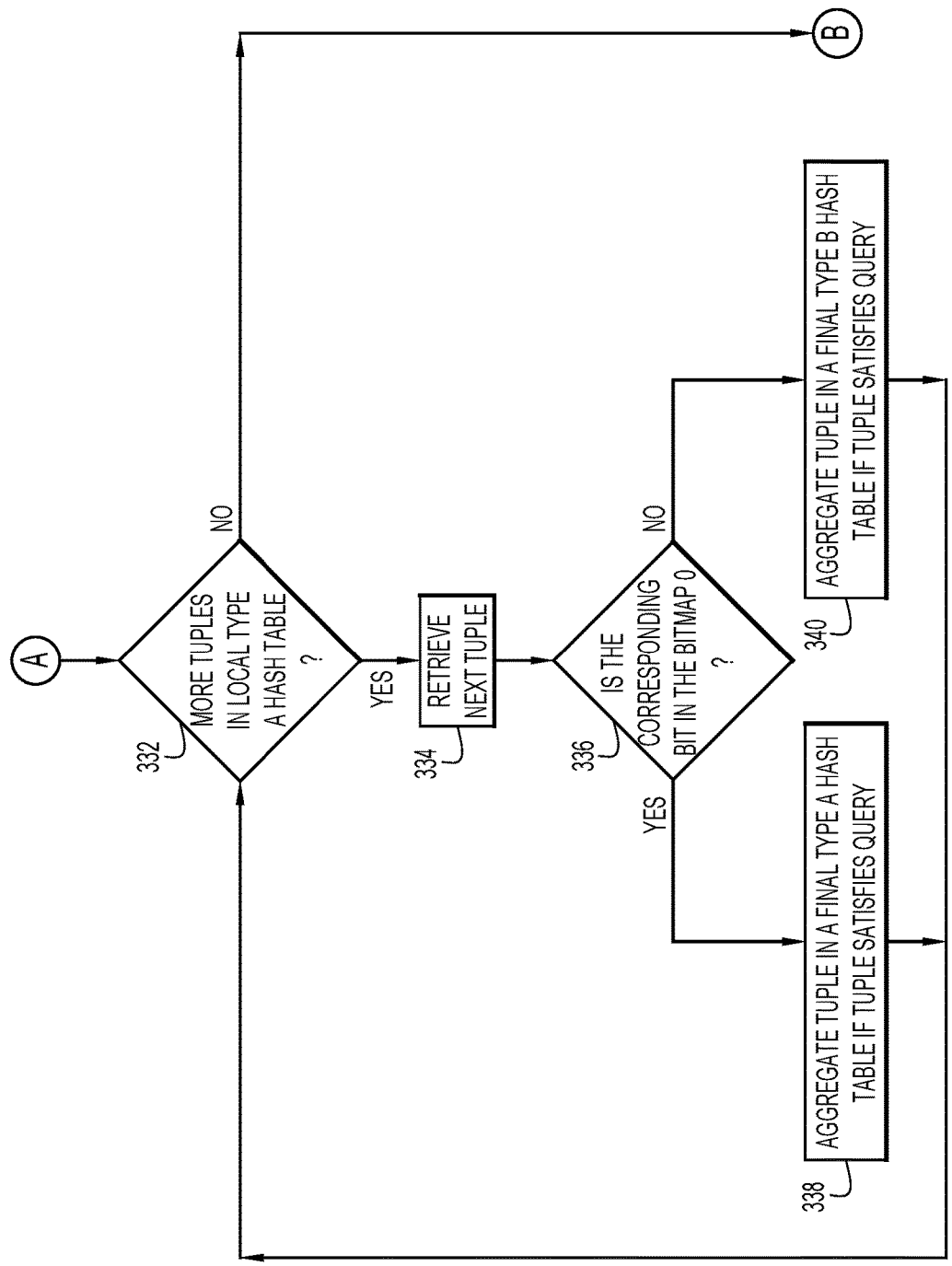
Figure 3C:
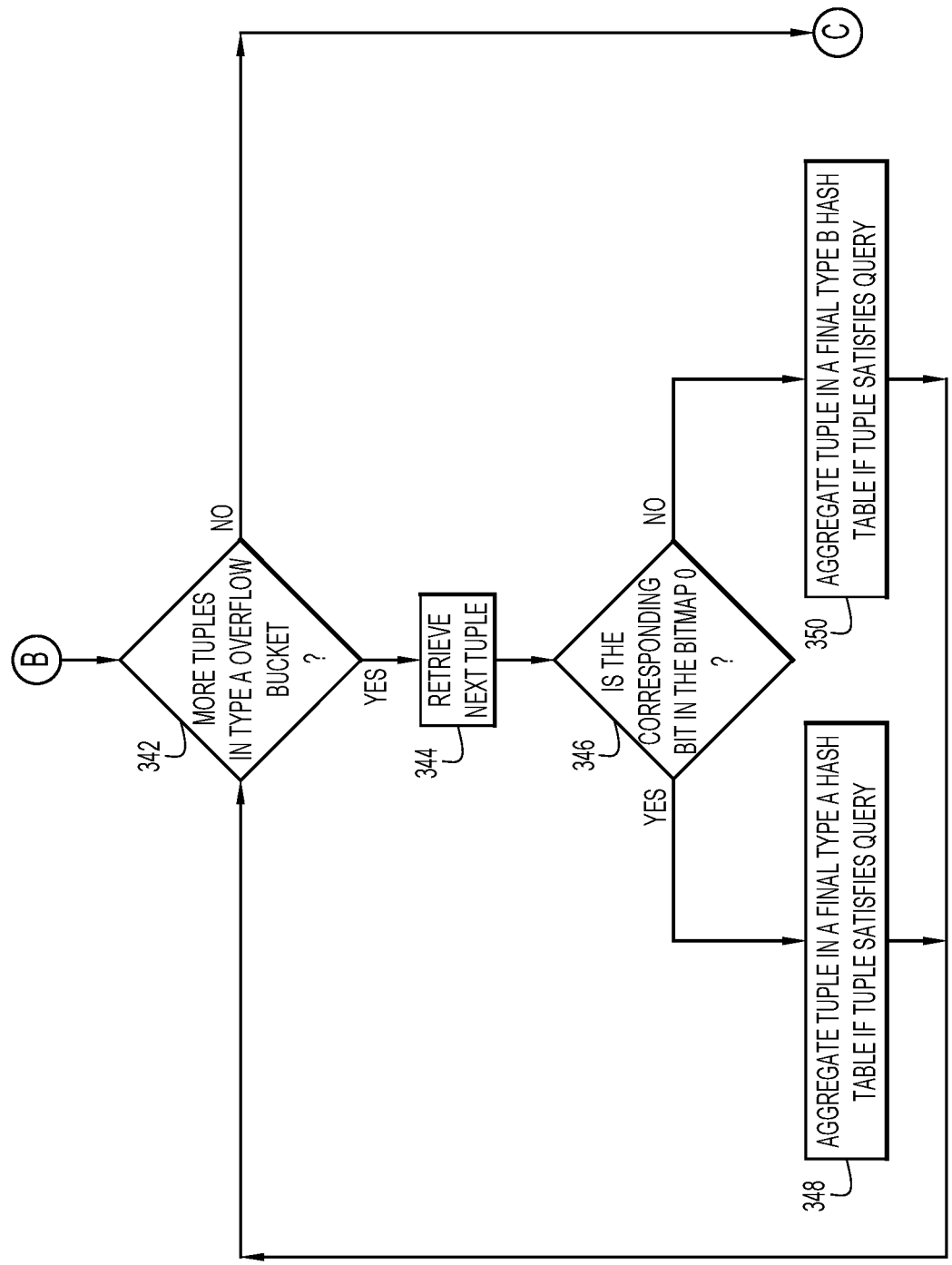
Figure 3D:
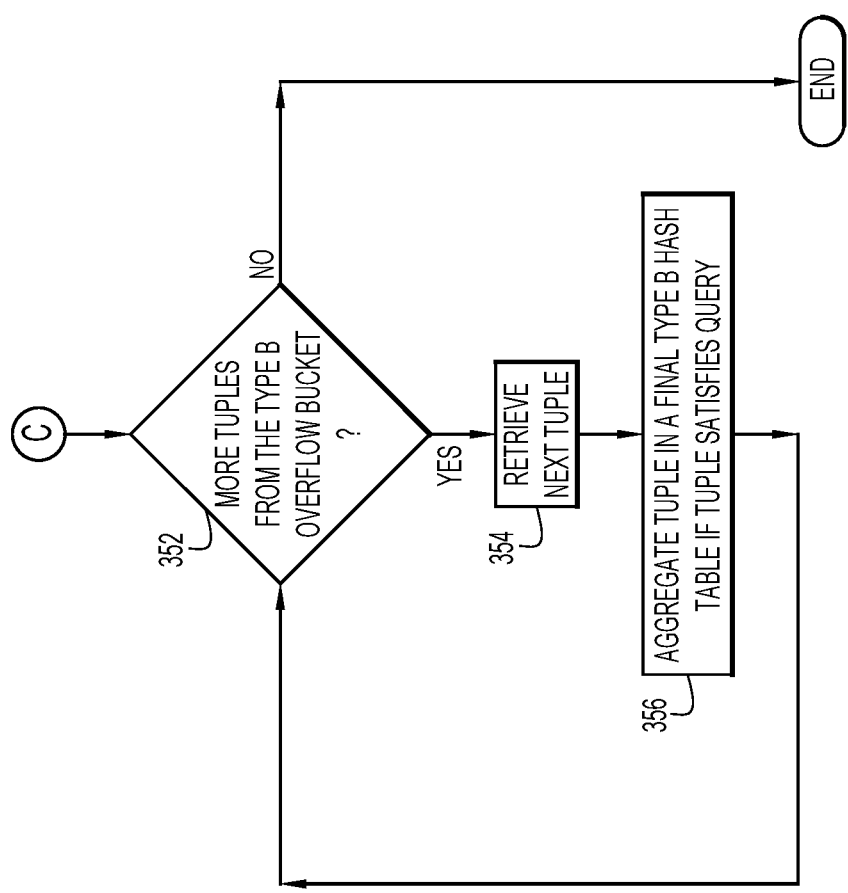

FIG. 3B illustrates an example manner of aggregating the local Type A hash table 410 data tuples in final hash tables, FIG. 3C illustrates an example manner of aggregating the Type A overflow bucket 412 data tuples in final hash tables, and FIG. 3D illustrates an example manner of aggregating the Type B overflow bucket 414 data tuples in final hash tables.

Figure 5:
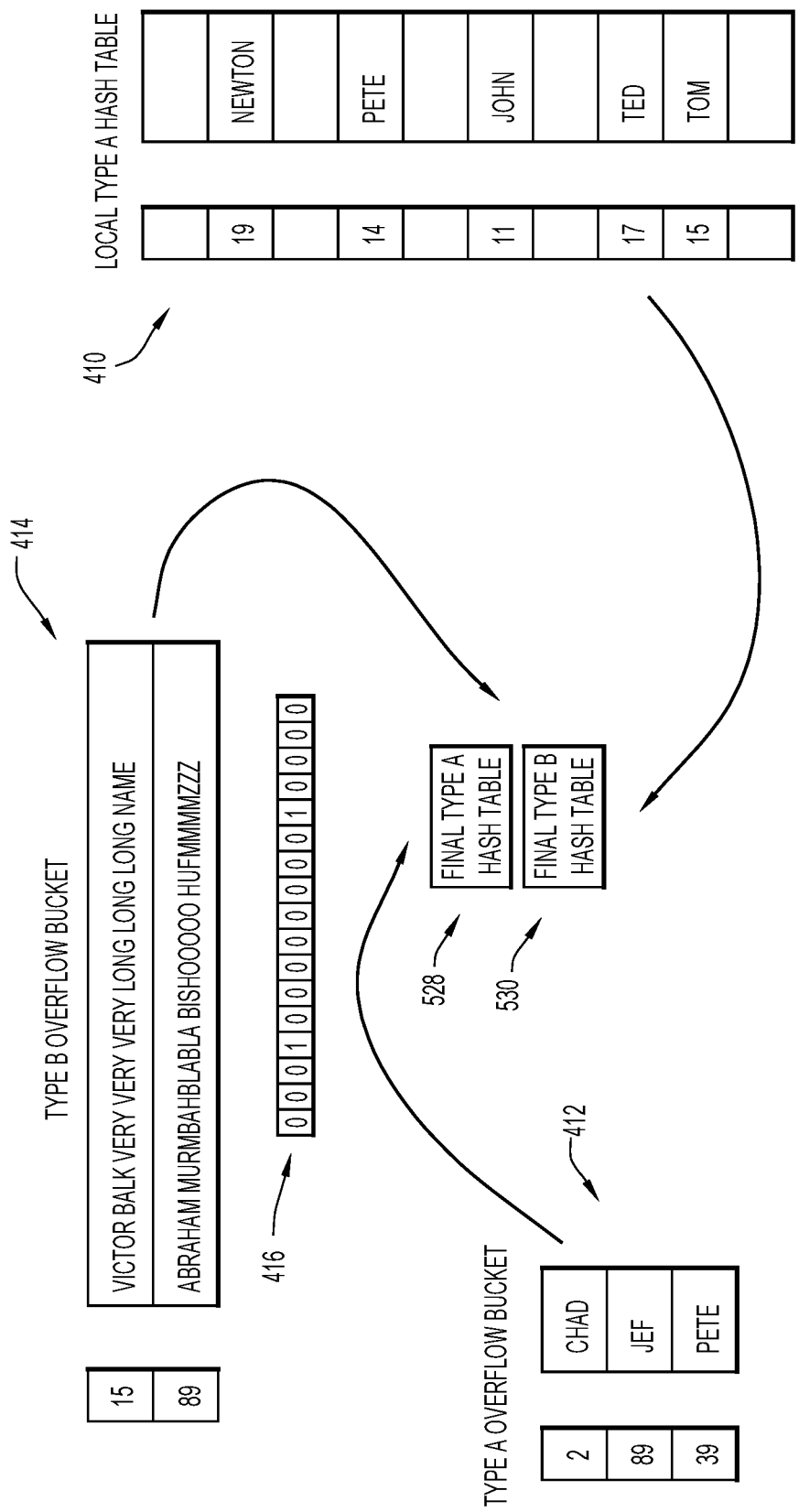
FIG. 5 is a diagrammatic illustration of the data tuples of FIG. 2 being aggregated from the local hash table and overflow buckets of FIG. 4 into a plurality of final hash tables, in accordance with an embodiment of the present invention.

FIGS. 3B-D will be described herein with reference to FIG. 5, which diagrammatically illustrates the flow of FIGS. 3B-D on a high level. Turning first to FIG. 5, shown are final Type A hash table 528 and final Type B hash table 530. The final Type A hash table 528 and final Type B hash table 530 include data tuples aggregated from local Type A hash table 410, Type A overflow bucket 412, and Type B overflow bucket 414, as illustrated by the arrows leading to the final hash tables 528, 530.

Turning now to FIG. 3B, and with continued reference to FIG. 5, shown is an example manner of aggregating the local Type A hash table 410 data tuples in final hash tables 528, 530. At block 332, it is determined whether there are data tuples in the local Type A hash table 410 that have not yet been retrieved. If so, a data tuple is retrieved at block 334. At block 336, it is determined whether the bit in the bitmap 416 that corresponds to the grouping element of the retrieved data tuple is zero. If the bit is determined to have a value of zero, the data tuple is aggregated in final Type A hash table 528 at block 338 if the tuple satisfies the query. However, if the bit is determined not to have a value of zero (i.e., if the bit is determined to have a value of one), the data tuple is aggregated in final Type B hash table 530 at block 340 if the tuple satisfies the query. The flow proceeds from blocks 338 and 340 to block 332, where it is again determined whether there are data tuples in the local Type A hash table 410 that have not yet been retrieved.

For example, if [17, Ted] is retrieved at block 334, [17, Ted] is aggregated in final Type A hash table 528 because the bit corresponding to grouping element "17" in bitmap 416 is zero. More specifically, the zero value of the bit indicates that there are no data tuples with a grouping element of "17" whose payload has a length greater than or equal to length L, and as such, [17, Ted] should be aggregated in final Type A hash table 528, whose payload column is less than length L.

In another example, [15, Tom] is retrieved at block 334. At block 336, it is determined that the bit corresponding to grouping element "15" has a value of one. As explained above, this bit has a value of one because [15, Victor Balk very very very very long long long name] is placed in Type B overflow bucket 414 since the length of "Victor Balk very very very very long long long name" is equal to or greater than length L. This bit having a value of one signals to the system that [15, Tom] may not satisfy the query because the query requires only one data tuple for each grouping element, and [15, Tom] and [15, Victor Balk very very very very long long long name] share the same grouping element. In this case, [15, Tom] is not aggregated in final Type B hash table 530 because "Victor Balk very very very very long long long name" is subsequent in the alphabet to "Tom," as per the query. As will be explained below, [15, Victor Balk very very very very long long long name] will be aggregated in the final Type B hash table 530 instead of [15, Tom], whose payload has a suitable length.

When there are no more data tuples in local Type A hash table 410 to be retrieved, the flow proceeds from block 332 to block B (FIG. 3C).

Turning now to FIG. 3C, and with continued reference to FIG. 5, shown is an example manner of aggregating the local Type A overflow bucket 412 data tuples in final hash tables 528, 530. At block 342, it is determined whether there are data tuples in the local Type A overflow bucket 412 that have not yet been retrieved. If so, a data tuple is retrieved at block 344. At block 346, it is determined whether the bit in the bitmap 416 that corresponds to the grouping element of the retrieved data tuple is zero. If the bit is determined to have a value of zero, the data tuple is aggregated in final Type A overflow bucket 528 at block 348 if the tuple satisfies the query. However, if the bit is determined not to have a value of zero (i.e., if the bit is determined to have a value of one), the data tuple is aggregated in final Type B hash table 530 at block 350 if the tuple satisfies the query. The flow proceeds from blocks 348 and 350 to block 342, where it is again determined whether there are data tuples in the local Type A overflow bucket 412 that have not yet been retrieved.

For example, if [2, Chad] is retrieved at block 344, [2, Chad] is aggregated in final Type A hash table 528 because the bit corresponding to grouping element "2" in bitmap 416 is zero. More specifically, the zero value of the bit indicates that there are no data tuples with a grouping element of "2" whose payload has a length greater than or equal to length L, and as such, [2, Chad] should be aggregated in final Type A hash table 528, whose payload column is less than length L.

In another example, [89, Jef] is retrieved at block 344. At block 346, it is determined that the bit corresponding to grouping element "89" has a value of one. As explained above, this bit has a value of one because [89, Abraham Murmbahblabla Bishooooo Hufmmmmzzz] is placed in Type B overflow bucket 414 since the length of "Abraham Murmbahblabla Bishooooo Hufmmmmzzz" is equal to or greater than length L. This bit having a value of one signals that [89, Jef] may not satisfy the query because the query requires only one data tuple for each grouping element, and [89, Jef] and [89, Abraham Murmbahblabla Bishooooo Hufmmmmzzz] share the same grouping element. In this case, [89, Jef], and not [89, Abraham Murmbahblabla Bishooooo Hufmmmmzzz], is aggregated in final Type B hash table 530 at block 350 because "Abraham Murmbahblabla Bishooooo Hufmmmmzzz" is prior in the alphabet to "Jef," as per the query. As will be explained below, [15, Victor Balk very very very very long long long name] will be aggregated in the final Type B hash table 530 instead of [15, Tom], whose payload has a suitable length.

When there are no more data tuples in local Type A overflow bucket 412 to be retrieved, the flow proceeds from block 342 to block C (FIG. 3D).

Turning now to FIG. 3D, and with continued reference to FIG. 5, shown is an example manner of aggregating the local Type B overflow bucket 414 data tuples in final Type B hash table 530. At block 352, it is determined whether there are data tuples in the local Type B overflow bucket 414 to be retrieved. If so, a data tuple is retrieved at block 354. At block 356, the data tuple is aggregated in final Type B hash table 530. The flow proceeds from block 356 to block 352, where it is again determined whether there are data tuples in the local Type B overflow bucket 414 that have not yet been retrieved.

For example, [15, Victor Balk very very very very long long long name] may be retrieved at block 354 and aggregated in final Type B hash table 530 at block 356. However, as explained above, [89, Abraham Murmbahblabla Bishooooo Hufmmmmzzz] is not retrieved at block 354 because it does not satisfy the query.

Figure 6:
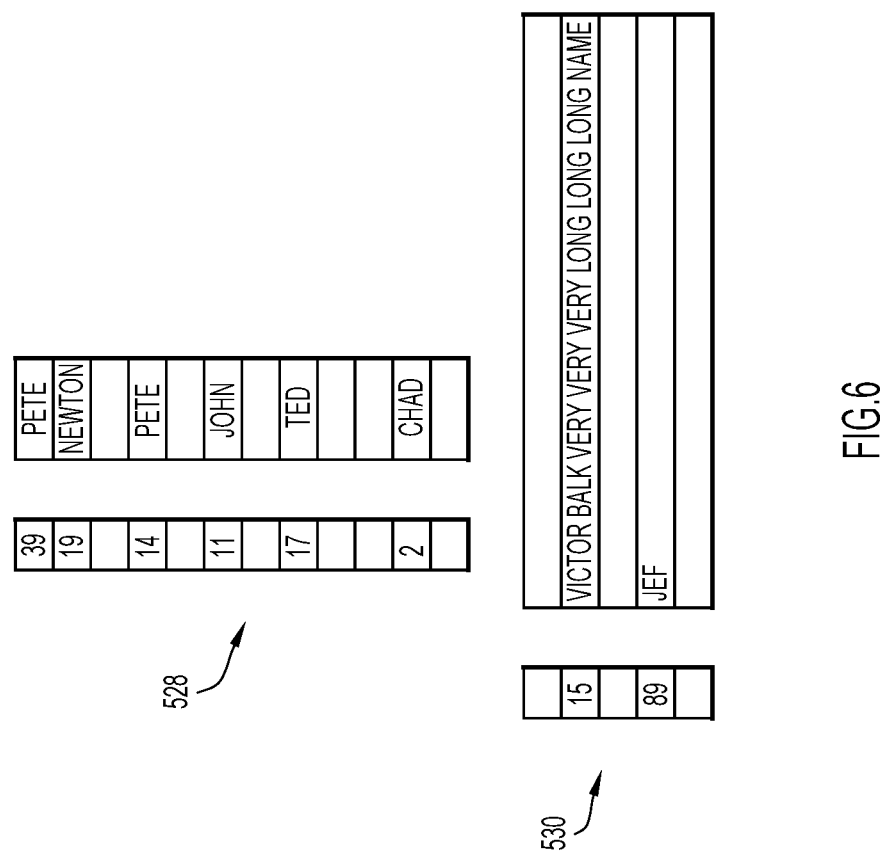
FIG. 6 is a block diagram of the final hash tables of FIG. 5, in accordance with an embodiment of the present invention.

FIG. 6 illustrates the query results, which are stored in final Type A hash table 528 and final Type B hash table 530. As shown, all the data tuples satisfying the query that do not share a grouping element with a data tuple whose payload is greater than length L are stored in final Type A hash table 528, whose payload column is less than length L. In other words, if the bit in the bitmap 416 corresponding to a grouping element of a data tuple that satisfies the query is zero, that data tuple is stored in the Type A hash table 528. In this example, Type A hash table 528 is expanded relative to local Type A hash table 410 in order to accommodate [39, Pete] and [2, Chad] from Type A overflow bucket 412.

Meanwhile, all the data tuples satisfying the query that share a grouping element with a data tuple whose payload is greater than or equal to length L are stored in final Type B hash table 530, whose payload column is greater than or equal to length L and can accommodate the payloads. In other words, if the bit in the bitmap 416 corresponding to a grouping element of a data tuple that satisfies the query is one, that data tuple is stored in the Type B hash table 530. For example, [89, Jef] is stored in final Type B hash table 530 instead of final Type A hash table 528 because, even though the "Jef" is less than length L, "Abraham Murmbahblabla Bishooooo Hufmmmmzzz" is not. Despite the "false positive" nature of the bloom filter (e.g., [89, Jef] is stored in final Type B hash table 530 even though it could be stored in final Type A hash table 528), this is acceptable because, with a reasonable hash function and filter bitmap size, the chance of a collision is limited and there is an overall increase in efficiency with these techniques.

Invention embodiments provide other example manners than that of FIGS. 3A-D. For example, the data tuples in the Type B overflow bucket may be aggregated in a final Type B hash table before or after the data tuples in the Type A overflow bucket are aggregated into final hash tables.

In other examples, there may be additional overflow buckets/hash tables to further handle data by length (e.g., Type C, D, etc.). For example, just as the final Type B hash table may include data tuples whose payloads are lengths less than L (i.e., payloads that could be stored in a Type A hash table), a final Type C hash table may include data tuples that could be stored in final Type A or Type B hash tables. Depending on the data distribution, these additional overflow buckets/hash tables may accommodate data of even greater lengths than Type B overflow buckets/hash tables.

When there are more than two hash tables of varying payload widths, a bitmap having multiple bits per unit may be used to identify which final hash table should include a given data tuple. For instance, a two-bit per unit bitmap may handle up to four different payload sized final hash tables (e.g., 00 may correspond to Type A, 01 may correspond to Type B, 10 may correspond to Type C, and 11 may correspond to Type D). If there are only three different payload sized final hash tables, a bit value of 00 may correspond to Type A, a bit value of 01 may correspond to Type B, and a bit value of 10 may correspond to Type C. A bit value of 11 may not be used in this example. This concept may be generalized to N bits per unit in the bitmap (e.g., one bit/unit for up to two Types, two bits/unit for up to four Types, three bits/unit for up to eight Types, etc.). Regardless of the number of types associated with the query processing, the final result is a union of the final hash tables.

The following example manner may determine the number of different hash tables/overflow bins and their corresponding payload widths, for example before the example manner of FIGS. 3A-D is implemented. An average length, histogram, or other distribution of data length may be acquired, as well as the relation to the specific payload column(s) implicated by the query. Based on these statistics, it may be determined how many different types of hash tables and overflow buckets (and their corresponding payload widths) should be used. For instance, for a query involving only a single payload column, this may be determined by the actual length distribution. For a query involving multiple payload columns, this may be determined, for example, by the distribution of one or more of the most influential columns (e.g., column(s) having the highest payload width). For instance, if three columns are implicated by the query, and the first column is VARCHAR(10), the second column is VARCHAR(2000), and the third column is VARCHAR(50), only statistics from the second column may be used to determine the number of different hash tables/overflow bins and their corresponding payload widths.

In general, this determination may be made based on length distribution/frequency. For example, 90% of the payloads are close to the average length, two different sized payload column vectors may be used for payload storage. If the data length distribution is close to three different sizes (e.g., if the distribution shows three peaks in frequency), three different sized payload column vectors may be used for payload storage.

The length of the payload columns of the overflow buckets/hash tables may be determined based on the lengths of the payloads of the data tuples. For instance, if 90% of the payloads are 20 bytes or less, and the maximum length of the remaining payloads is 200 bytes, a wider hash table/overflow bucket (e.g., a Type B hash table/overflow bucket) may have a payload column of 200 bytes. In another example, the length of the payload column for a smaller hash table (e.g., a Type A hash table/overflow bucket) may also be selected based on payload length statistics. For instance, if a payload column is defined as VARCHAR(2000) and the average payload length within the column is 20 bytes, the Type A payload width may be a multiple of 20 bytes (e.g., 40 bytes, 100 bytes, etc.). Other techniques may be used in other situations, for example when the average payload length is closer to the maximum payload length.

In a further example, after the number of different hash tables/overflow bins and their corresponding payload widths are determined, a bloom filter (e.g., bitmap) may be created to facilitate the aggregation processing. If there are only two different sized payloads, a bitmap having a size twice that of the grouping element cardinality may be used. For every tuple, if its payload length is greater than or equal to L, the bit in the bitmap mapped by hashing the grouping element is set to 1. If the payload length is smaller than L, the bit may remain at zero, signaling that data tuples corresponding to a particular grouping element should be aggregated using the hash table with the smaller payload width. In the case where a first data tuple having a payload smaller than length L is first retrieved and the corresponding bit remains at zero accordingly, but a second data tuple is later retrieved having a payload length greater than or equal to length L, the corresponding bit may be flipped to one.

For architectures with more than two types (e.g., architectures that includes Type C, D, etc.), data tuples may be overflowed to Type A, B, C, D, etc. overflow buckets. These tuples may later be merged/aggregated into final Type A, B, C, D, etc. hash tables, as described above.

The techniques described herein may be applied to queries of any suitable type. For queries involving minimum and maximum aggregation functions, certain data tuples may only be aggregated in an overflow bucket, and cause the corresponding bit in the bitmap to be updated, if the data tuple may satisfy the query. For example, if a data tuple does not include a maximum value and the query is for a maximum value, memory/resources may not be allocated to aggregating that data tuple and/or changing the corresponding bit. In an invention embodiment, if a data tuple is the first of its element group to be aggregated into a hash table, the data tuple may not be ignored/discarded because it has not yet been ruled out as a possible data tuple to include in the query results. If the query includes other functions (e.g., COUNT( ) SUMO( ), etc.), the values of the payloads should be taken into account as appropriate.

In an invention embodiment, an extra flag or status column may be associated with the hash tables/overflow buckets to avoid using the bit map. However, a bit map is more cache friendly and efficient to use than an extra column. Additionally, there is a desire to allocate as little memory as necessary to the hash tables, whereas the number of bits in the bitmap may be very large. However, a hierarchical multi-tier hash table framework may be used in accordance with the examples presented herein.

It will be appreciated that the embodiments described above and illustrated in the drawings represent only a few of the many ways of implementing embodiments for aggregating variable length data in response to a query.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, query data aggregation module, etc.). These systems may include any types of monitors and input devices (e.g., keyboard, mouse, voice recognition, etc.) to enter and/or view information.

It is to be understood that the software (e.g., query data aggregation module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., query data aggregation module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., survey responses, etc.). The database system may be implemented by any number of any conventional or other databases, data stores or storage structures (e.g., files, databases, data structures, data or other repositories, etc.) to store information (e.g., survey responses, etc.). The database system may be included within or coupled to the server and/or client systems. The database systems and/or storage structures may be remote from or local to the computer or other processing systems, and may store any desired data (e.g., survey responses).

The present invention embodiments may employ any number of any type of user interface (e.g., Graphical User Interface (GUI), command-line, prompt, etc.) for obtaining or providing information (e.g., survey responses), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any aggregation of data in response to a query.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for processing a database query aggregating data, the computer program product comprising a computer readable storage medium having computer readable program code embodied therewith, the computer readable program code executable by a processor to cause the processor to:
analyze data tuples of a database object each including a grouping element and a data element to determine a length of the data element for each data tuple, wherein a plurality of tables each accommodate a different corresponding length for the data element, and wherein the corresponding length for the data element is successively greater across the plurality of tables;
determine a corresponding table of the plurality of tables to store each data tuple based on the length of the data element of that data tuple satisfying an accommodated length of the plurality of tables;
store each data tuple in the determined corresponding table to group the data tuples within each of the plurality of tables based on the grouping element;
provide an indication for each group pertaining to a presence of members of that group in more than one of the plurality of tables; and
combine the groups across the plurality of tables to aggregate the data tuples for the database query, wherein the combing the groups across the plurality of tables further comprises:
retrieving a data tuple from a first table of the plurality of tables and evaluating the indication for a group of the retrieved data tuple;
in response to the evaluated indication indicating a presence of members of the group of the retrieved data tuple in one or more other tables of the plurality of tables:
retrieving the members of the group of the retrieved data tuple from the one or more other tables of the plurality of tables;
determining one or members of the group of the retrieved data tuple satisfying the database query; and
storing the determined one or more members in one or more corresponding result tables providing results for the database query.

2. The computer program product of claim 1, wherein the plurality of tables includes hash tables with the grouping element serving as a hash key.

3. The computer program product of claim 1, wherein the processor provides the indication by:
storing the indication in a bitmap including one or more bits for each group, wherein each pattern of the one or more bits is associated with one of the plurality of tables.

4. The computer program product of claim 3, wherein the processor combines the groups across the plurality of tables by:
aggregating members of a group within one of the plurality of tables.

5. The computer program product of claim 4, wherein the processor further combines the groups across the plurality of tables by:
merging the aggregated members into a next one of the plurality of tables having members of that group based on the bitmap.

6. The computer program product of claim 1, wherein the length of the data element provided by the plurality of tables is based on one or more from a group of average length of data elements of the database object, distribution of the length of data elements in the database object, and frequency of data elements in the database object.

7. The computer program product of claim 1, wherein a type of the data element includes a variable length data element.

8. A method of processing a database query aggregating data comprising:
analyzing data tuples of a database object each including a grouping element and a data element to determine a length of the data element for each data tuple, wherein a plurality of tables each accommodate a different corresponding length for the data element, and wherein the corresponding length for the data element is successively greater across the plurality of tables;
determining a corresponding table of the plurality of tables to store each data tuple based on the length of the data element of that data tuple satisfying an accommodated length of the plurality of tables;
storing each data tuple in the determined corresponding table to group the data tuples within each of the plurality of tables based on the grouping element;
providing an indication for each group pertaining to a presence of members of that group in more than one of the plurality of tables; and
combining the groups across the plurality of tables to aggregate the data tuples for the database query, wherein the combing the groups across the plurality of tables further comprises:
retrieving a data tuple from a first table of the plurality of tables and evaluating the indication for a group of the retrieved data tuple;
in response to the evaluated indication indicating a presence of members of the group of the retrieved data tuple in one or more other tables of the plurality of tables:
retrieving the members of the group of the retrieved data tuple from the one or more other tables of the plurality of tables;

determining one or members of the group of the retrieved data tuple satisfying the database query; and storing the determined one or more members in one or more corresponding result tables providing results for the database query.

9. The method of claim 8, wherein the plurality of tables includes hash tables with the grouping element serving as a hash key.

10. The method of claim 8, wherein providing the indication comprises:

storing the indication in a bitmap including one or more bits for each group, wherein each pattern of the one or more bits is associated with one of the plurality of tables.

11. The method of claim 10, wherein combining the groups across the plurality of tables comprises:

aggregating members of a group within one of the plurality of tables.

12. The method of claim 11, wherein combining the groups across the plurality of tables further comprises:

merging the aggregated members into a next one of the plurality of tables having members of that group based on the bitmap.

13. The method of claim 8, wherein the length of the data element provided by the plurality of tables is based on one or more from a group of average length of data elements of the database object, distribution of the length of data elements in the database object, and frequency of data elements in the database object.

14. The method of claim 8, wherein a type of the data element includes a variable length data element.

15. A system for processing a database query aggregating data comprising:

a computer system including at least one processor configured to:

analyze data tuples of a database object each including a grouping element and a data element to determine a length of the data element for each data tuple, wherein a plurality of tables each accommodate a different corresponding length for the data element, and wherein the corresponding length for the data element is successively greater across the plurality of tables;

determine a corresponding table of the plurality of tables to store each data tuple based on the length of the data element of that data tuple satisfying an accommodated length of the plurality of tables;

store each data tuple in the determined corresponding table to group the data tuples within each of the plurality of tables based on the grouping element;

provide an indication for each group pertaining to a presence of members of that group in more than one of the plurality of tables; and combine the groups across the plurality of tables to aggregate the data tuples for the database query, wherein the combing the groups across the plurality of tables further comprises:

retrieving a data tuple from a first table of the plurality of tables and evaluating the indication for a group of the retrieved data tuple;

in response to the evaluated indication indicating a presence of members of the group of the retrieved data tuple in one or more other tables of the plurality of tables:

retrieving the members of the group of the retrieved data tuple from the one or more other tables of the plurality of tables;

determining one or members of the group of the retrieved data tuple satisfying the database query; and storing the determined one or more members in one or more corresponding result tables providing results for the database query.

16. The system of claim 15, wherein the plurality of tables includes hash tables with the grouping element serving as a hash key.

17. The system of claim 15, wherein the at least one processor is configured to provide the indication by:

storing the indication in a bitmap including one or more bits for each group, wherein each pattern of the one or more bits is associated with one of the plurality of tables.

18. The system of claim 17, wherein the at least one processor is configured to combine the groups across the plurality of tables by:

aggregating members of a group within one of the plurality of tables; and merging the aggregated members into a next one of the plurality of tables having members of that group based on the bitmap.

19. The system of claim 15, wherein the length of the data element provided by the plurality of tables is based on one or more from a group of average length of data elements of the database object, distribution of the length of data elements in the database object, and frequency of data elements in the database object.

20. The system of claim 15, wherein a type of the data element includes a variable length data element.

* * * * *